United States Patent
Santoro et al.

(10) Patent No.: US 9,541,989 B2
(45) Date of Patent: Jan. 10, 2017

(54) POWER TRANSFER ESTIMATION

(71) Applicant: Texas Instruments Deutschland GmbH, Freising (DE)

(72) Inventors: Francesco Silvio Santoro, Munich (DE); Ralf Peter Brederlow, Poing (DE); Niel Gibson, Freising (DE); Rüdiger Kuhn, Freising (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 115 days.

(21) Appl. No.: 14/543,565

(22) Filed: Nov. 17, 2014

(65) Prior Publication Data

US 2016/0139650 A1 May 19, 2016

(51) Int. Cl.
*G06F 1/26* (2006.01)
*G06F 1/32* (2006.01)

(52) U.S. Cl.
CPC ........... *G06F 1/3287* (2013.01); *G06F 1/3206* (2013.01)

(58) Field of Classification Search
CPC .................................... G06F 1/26; G06F 1/28
USPC ....................................................... 713/322
See application file for complete search history.

(56) References Cited

U.S. PATENT DOCUMENTS

| | | | | |
|---|---|---|---|---|
| 6,522,089 | B1 * | 2/2003 | Duong | H05B 41/2928 315/291 |
| 6,943,538 | B2 * | 9/2005 | Choi | G01R 21/127 324/142 |
| 7,479,742 | B2 * | 1/2009 | Matsui | H05B 41/2887 315/209 R |
| 2009/0284235 | A1 * | 11/2009 | Weng | H02M 3/156 323/222 |
| 2013/0154594 | A1 * | 6/2013 | Zipperer | H02M 3/157 323/282 |
| 2014/0159585 | A1 * | 6/2014 | Reed | H05B 33/0815 315/130 |
| 2014/0253096 | A1 * | 9/2014 | Diewald | G01R 21/007 324/103 R |
| 2016/0048197 | A1 * | 2/2016 | Hanssen | G01R 21/00 713/323 |

* cited by examiner

*Primary Examiner* — Vincent Tran
(74) *Attorney, Agent, or Firm* — John R. Pessetto; Charles A. Brill; Frank D. Cimino

(57) ABSTRACT

A power conversion system includes a power transfer estimator that is operable to provide a determination of the cumulative amount of power transferred through the power supply, without additional sensing elements and at extremely low power levels, and to provide such determinations periodically over potentially long periods of time commensurate with the lifetime of a limited power source such as a battery. In a power conversion system operating in a discontinuous conduction mode (DCM), the power transfer estimator determines the charge transferred during each switching cycle, and the total number of switching cycles, to calculate the cumulative amount of power transferred. The power transfer estimator is optionally operable to calculate a value for the inductance to be used in the determination of the cumulative amount of power transferred through the power supply.

6 Claims, 3 Drawing Sheets

POWER TRANSFER ESTIMATION

BACKGROUND

The amount of power consumed by electronic devices often limits the utility of the electronic devices, especially for electronic devices having limited power sources (such as batteries, capacitors, solar cells, and the like). Because the rates of power consumption within a single electronic device typically vary over time, it can be difficult to determine efficiently the cumulative amount of power consumed by the electronic device at various points of time during operation of the electronic device. Estimation of the power consumption of electronic devices is often determined by using sensing components that entail higher cost and/or higher power consumption.

SUMMARY

The problems noted above can be solved in a power transfer estimator is operable to estimate a cumulative power transfer through a power converter. The power transfer estimation is determined in response to an inductance value of an inductor, a voltage measurement of the received input power, and a switching metric that is accumulated in response to actuation of a power switch of the power converter.

Accordingly, the power transfer estimation can be determined without an optional (e.g., single-purpose) sensing element, which avoids power consumption on the part of the sensing element to measure power transference. The power transfer estimation can be performed periodically over the periods of time to provide an estimate of power remaining in a limited power source regardless of the operating mode of the power converter. The power transfer estimator is optionally operable to measure the inductance of the inductor through which power is transferred from the input to the output of the power converter.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . " Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion. The term "calibration" can include the meaning of the word "test." The term "input" can mean either a source or a drain (or even a control input such as a gate where context indicates) of a PMOS (positive-type metal oxide semiconductor) or NMOS (negative-type metal oxide semiconductor) transistor. The term "pulse" can mean a portion of waveforms such as "squarewave" or "sawtooth" waveforms.

Figure 1:
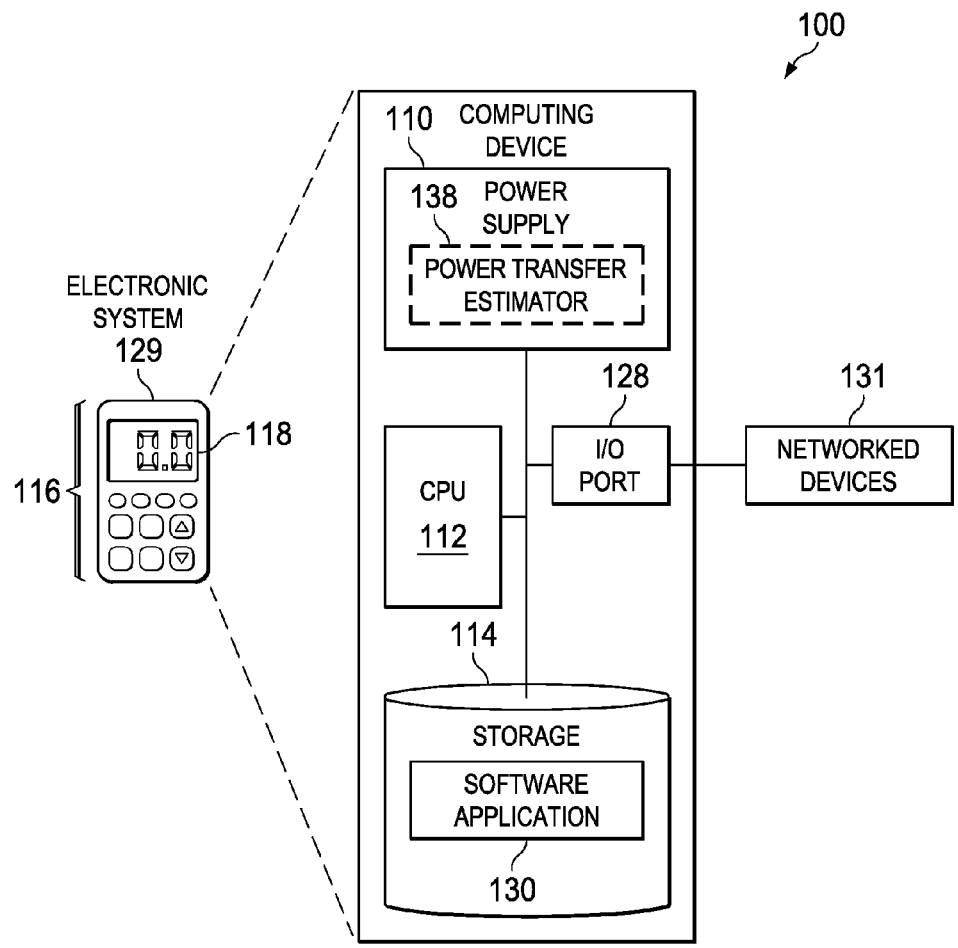
FIG. 1 shows an illustrative electronic device in accordance with example embodiments of the disclosure.

FIG. 1 shows an illustrative computing device 100 in accordance with embodiments of the disclosure. For example, the computing device 100 is, or is incorporated into, or is coupled (e.g., connected) to an electronic system 129, such as a computer, electronics control "box" or display, communications equipment (including transmitters or receivers), or any type of electronic system operable to process information.

In some embodiments, the computing device 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like.

The CPU 112 and power supply 110 are coupled to I/O (Input-Output) port 128, which provides an interface that is configured to receive input from (and/or provide output to) networked devices 131. The networked devices 131 can include any device (including test equipment) capable of point-to-point and/or networked communications with the computing device 100. The computing device 100 is often coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 is accessible, for example, by the networked devices 131. The CPU 112, storage 114, and power supply 110 are also optionally coupled to an external power supply (not shown), which is configured to receive power from a power source (such as a battery, solar cell, "live" power cord, inductive field, fuel cell, capacitor, and the like).

The power supply 110 comprises power generating and control components for generating power to enable the computing device 100 to executed the software application 130. For example, the power supply 110 provide one or more power switches, each of which can be independently controlled, that supply power at various voltages to various components of the computing device 100. The power supply 110 is optionally in the same physical assembly as computing device 100, or is coupled to computing device 100. The computing device 100 optionally operates in various power-saving modes wherein individual voltages are supplied (and/or turned off) in accordance with a selected power-saving mode and the various components arranged within a specific power domain.

The power supply 110, for example, includes a power transfer estimator 138. Although the power transfer estimator 138 is illustrated as being included in the power supply 110 or as a single (e.g., logical) unit, various portions of the power transfer estimator 138 are optionally included in the same module (e.g., as formed by a die as produced in semiconductor manufacturing) or in different modules.

The power supply 110 is in various embodiments a switched-mode power supply (e.g., "converter") that alternately stores and outputs energy. Such converters typically receive either a DC (direct current) or rectified AC (alternating current) voltage as an input voltage. Energy derived from the input voltage is temporarily stored in energy storage devices (such as an inductors and capacitors) during each switching cycle. The power switch in the converter is actuated (e.g., opened for a "turned on" state or closed for a "turned off" state) to control the amount of energy that is output. A filter is normally used to reduce ripple in the output DC voltage and current. Depending on the topology selected for the converter, the output DC voltage can be higher or lower than the input voltages. The output DC voltage can also be inverted with respect to the input voltage.

Switching converters typically operate in either a discontinuous mode or a continuous mode. In the discontinuous mode, converters completely de-energize the energy storage devices before the end of every switching cycle. Accordingly, no current flows in the energy storage devices at the start of every switching cycle in the discontinuous mode. In the continuous mode, converters normally do not completely de-energize the energy storage devices before the end of every switching cycle. Accordingly, the current in the energy storage devices operating in a continuous mode normally does not reach a point where current does not flow in the energy storage devices.

The discontinuous inductor current conduction mode (DCM) is a power mode that is used to improve light load efficiency in switching power converters. Because many computing devices 100 typically operate in applications that present electrical loads that are in the light-to-medium load current range, the light-load efficiency of voltage regulators has a substantial impact of the power efficiency of a system.

The output of a converter is determined in part by the duty ratio. The duty ratio is the time period in which the switch is "on" divided by the time period of the switching cycle (e.g., in accordance with the equation: $D=Ton/Tp$). The switching cycle time period is typically equal to the time period the switch is "on" plus the time period in which the switch is "off" and plus any time period in which the switch is "idle" (where $Tp=Ton+Toff+Tidle$; as discussed below with respect to FIG. 3). The output voltage of the converter is theoretically equal to the input voltage multiplied by the duty ratio (e.g., in accordance with the equation: $Vout=Vin*D$). The ranges of values of Ton and Toff are typically selected during design time (e.g., to enhance operating stability while operating with the feedback control signals).

In one example, the power supply 110 is a DC-DC converter operable to operate in a discontinuous conduction mode (DCM). The power supply 110 includes a power transfer estimator 138 that is operable to determine a cumulative amount of power transferred through the power supply 110. The power transfer estimator 138 is operable to determine an amount of charge transferred through the power transfer estimator 138 during each switching cycle during a selected period of operation while operating in the DCM. The power transfer estimator 138 is also operable to determine a number of switching cycles over the selected period of operation. In response to the determined charge amount and the accumulated number of switching cycles (e.g., wherein each of the switching cycles has a duration equal to the duration of the other switching cycles), the power transfer estimator 138 is operable to estimate the cumulative amount of power transferred over the selected period of operation. The power transfer estimator 138 is optionally operable to calculate an inductance value for an inductor L to transfer power through the power supply 110.

In response to the estimation, the computing device 100 is operable to perform a power-saving function. Such power-saving functions include providing an indication of a charge remaining (or consumed) of a limited power source, change the operating mode of the power supply 110, couple additional power sources to the computing device 100, and other like functions.

At any given point in time (e.g., represented by (t)) the power flowing through a power supply 110 can be represented as: $P(t)=V(t)*I(t)$. In conventional systems, for example, direct measurements of current are often performed by measuring the voltage developed across a current sensor (e.g., a resistor) coupled in series with the output node of the power supply 110. Sensor elements (such as the in-series resistors) generate additional heat and increase cost. Accordingly the use of the current sensor elements increases overall power consumption and reduces the overall efficiency of the system incorporating the current sensor.

Furthermore, a determination of cumulative power consumption (e.g., over a selected period of time) requires a continual measurement of current in order to integrate the value of the function $I=V/R$ over time. In contrast, the disclosed power transfer estimator 138 is operable to determine (e.g., making relatively accurate estimations) the cumulative power transfer through the power supply 110 periodically over potentially long periods of time and at relatively low power levels.

Figure 2:
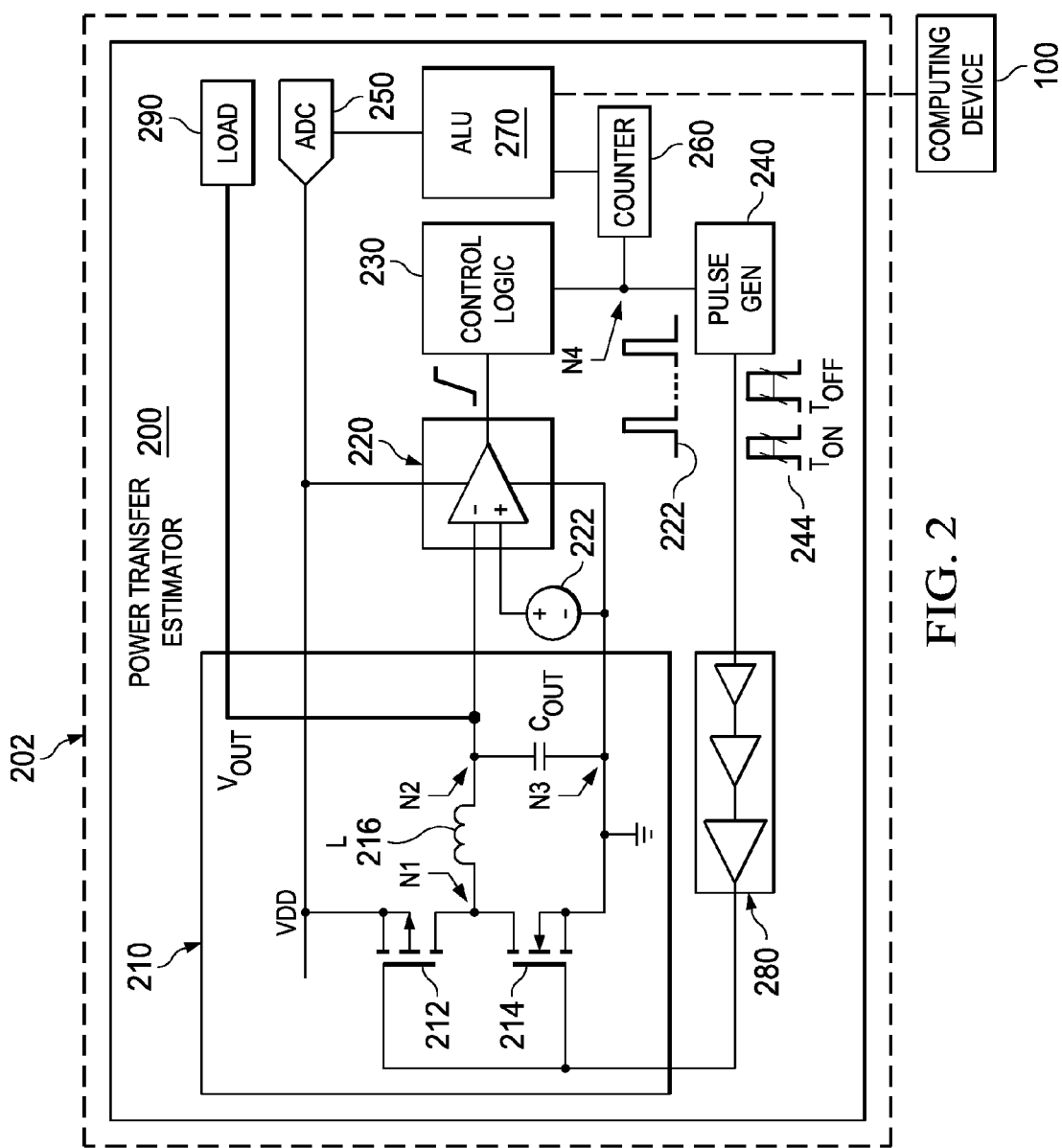
FIG. 2 is a schematic diagram of a power transfer estimator in accordance with example embodiments of the disclosure.

FIG. 2 is a schematic of a power transfer estimator system 200 in accordance with example embodiments of the disclosure. The power transfer estimator system 200 includes a particular embodiment of the power transfer estimator 138 of FIG. 1, and is optionally formed (e.g., in whole or in part) on a substrate 202. Generally described, the power transfer estimator system 200 comprises a buck converter 210, a comparator 220, a control logic circuit 230, a pulse generator 240, an analog-to-digital converter (ADC) 250, an accumulator such as digital counter 260, an arithmetic logic unit (ALU) 270, and a power MOS driver 280.

The buck converter 210 comprises a high-side PMOS switch 212, a low-side NMOS switch 214, an energy storage element such as inductor 216, and a capacitor Cout. The inductor 216 is coupled between a node N1 and a node N2 (Vout). Node N1 is (e.g., electrically) located between the high-side PMOS switch 212 and the low-side NMOS switch 214, whereas node N2 is located between a high-side terminal of the capacitor Cout and an inverting input of the comparator 220. Node N2 is optionally coupled to a load 290 (which may draw varying amounts of current over time).

In operation of the power estimation system 200, the power switch (e.g., comprising the high-side PMOS switch 212 and the low-side NMOS switch 214) is actuated repeatedly over a series of power cycles, where each power cycle includes an on period, an off period, and an idle period. During the on period, when the high-side PMOS switch 212 is opened and the low-side NMOS switch 214 is closed, the current drawn from the voltage source VDD passes through the node N1, through the inductor 216, through the node N2 (Vout), and branches (e.g., in part) along a first path to the load 290. The drawn current is also branched along a second path from the node N2 to a high-side terminal of the capacitor Cout. Capacitor Cout (which low-pass filters the output of the inductor 216) includes a low-side terminal coupled to ground (via node N3). Node N2 is also coupled to the inverting input of the comparator 220 (which is powered from the power supply rails VDD and ground) while the non-inverting input of the comparator 220 is coupled to the voltage reference 222.

The comparator 220 is operable to compare the voltage of node N2 (Vout) with the voltage generated by the voltage reference 222 to provide the results of the comparison at an input of the control logic circuit 230. When the high-side PMOS switch 212 is opened and the low-side NMOS switch 214 is closed (e.g., when the power switch is open), the voltage at the inverting input of the comparator 220 increases to a level higher than the voltage at the non-inverting input of the comparator 220. In response to the inverting input of the comparator 220 increasing to a level that is higher than the voltage at the non-inverting input of the comparator, the output of the comparator toggles from a logic high state to a logic low state (e.g., to a low logic level state such as a ground level).

When the high-side PMOS switch 212 is closed and the low-side NMOS switch 214 is opened (e.g., when the power switch is closed), the voltage at the inverting input of the comparator 220 decreases to a level that is lower than the voltage at the non-inverting input of the comparator 220. When the voltage at the inverting input becomes less than the voltage of the inverting input, the comparator 220 output transitions to a high logic state.

The control logic circuit 230 detects the transition of the comparator 220 out and generates a pulse 224 for each detected transition. The pulses 224 generated by the control logic circuit 230 are coupled to the pulse generator 240 and the counter 260. The pulse generator is operable to generate the Ton and Toff pulses 244 for controlling the power MOS driver 280 (e.g., to control the voltage level of the buck converter 210 output). In response to (e.g. the Ton) pulses 244, the counter 260 is operable to accumulate (e.g., count) the pulses 224 generated by the control logic 230 over an estimation period for which the power transfer estimation is produced.

The power MOS driver 280 comprises one or more amplifier circuits (for example) coupled in series. The MOS driver 280 includes an input driven by the pulse generator 240 and an output coupled to the control inputs (e.g., gates) high-side PMOS switch 212 and the low-side NMOS switch 214. The Ton and Toff pulses 244 from the pulse generator 240 supply timing information to the power MOS driver 280 for actuating the high-side PMOS switch 212 and the low-side NMOS switch 214.

The analog-to-digital converter (ADC) 250 is coupled to the source voltage VDD and the arithmetic logic unit (ALU) 270. In operation, the ADC 250 converts the amplitude of the source voltage VDD to a digital voltage value and provides the digital voltage value to the ALU 270. The digital counter 260 is coupled (via node N4) to the arithmetic logic unit (ALU) 270. The digital counter 260 generates a switching metric in response to the accumulated pulses 224. The switching metric is coupled to the ALU 270. The ALU 270 is operable to estimate the transfer of power across the power transfer estimator system 200 as discussed below with respect to FIG. 3. In various embodiments, a processor of the computing device 100 optionally performs some or all of the functionality of ALU 270.

Figure 3:
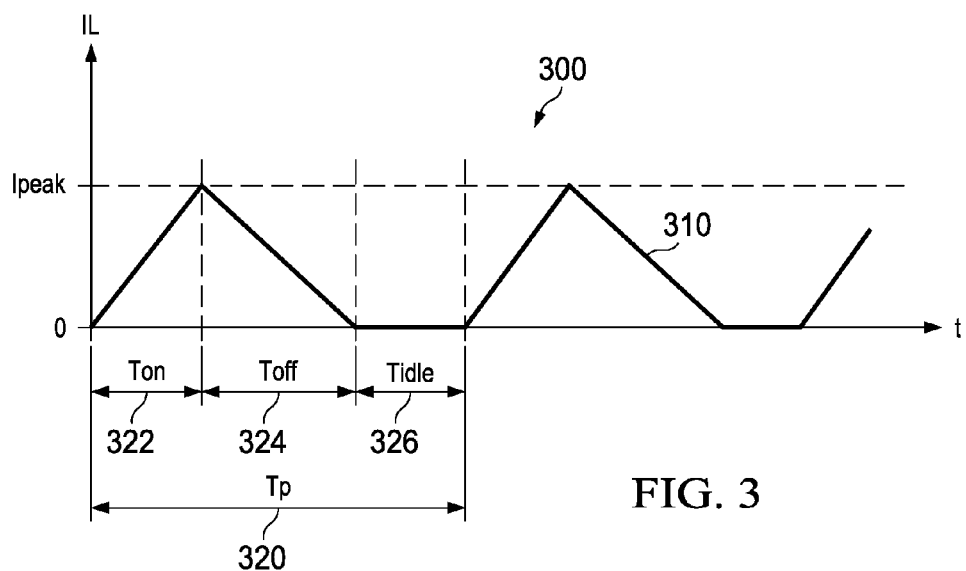
FIG. 3 is a waveform diagram illustrating an inductor current waveform of a power transfer estimator in accordance with example embodiments of the disclosure.

FIG. 3 is a waveform diagram illustrating the inductor current waveform of a power transfer estimator in accordance with example embodiments of the disclosure. Generally described, waveform diagram 300 illustrates a waveform 310 of a power converter operating in a discontinuous power mode. Waveform 310 illustrates an inductor current such as. the current through the inductor 216 (FIG. 2) over repeating operating cycles.

Each operating cycle occurs during a time period (Tp) 320. Each time period 320 includes a time on (Ton) period 322, a time off (Toff) period 324, and a time idle (Tidle) period. During the Ton period 322, the current increases from a zero point to a current peak (Ipeak). During the Toff, period 324, the current decreases from Ipeak to the zero point. During the Tidle time period 326, the current remains at the zero point. The value of Ipeak can be predetermined (e.g., at design time or during a period of operation of the power converter before the power transfer estimation circuitry is activated).

The charge transferred across the inductor to the battery is equal to the charge transferred during the Ton period 322, which is expressed as:

$$Q_{BATT} = \frac{I_{PEAK} t_{ON}}{2} \quad (1)$$

where $Q_{BATT}$ is the charge transferred from the battery (e.g., being discharged), $I_{PEAK}$ is the maximum current, and $t_{ON}$ is the time on period.

Expressed in terms of inductance and voltage, $Q_{BATT}$ is expressed as:

$$Q_{BATT} = \frac{V_{IN} - V_{OUT}}{2L} t_{ON}^2 \quad (2)$$

However, $t_{ON}$ can be expressed as:

$$t_{ON} = \frac{I_{PEAK}L}{V_{IN} - V_{OUT}} \quad (3)$$

Substituting Eq. 3 for $t_{ON}$ in Eq. 2 yields:

$$Q_{BATT} = \frac{I_{PEAK}^2 L}{2(V_{IN} - V_{OUT})} \quad (4)$$

Certain variables whose values are known before operation (e.g., constants) can be precalculated before operation of the power converter. For example, when the inductance and maximum current are known before operation, a constant reflecting the values of the inductance and capacitance can be expressed as:

$$\alpha = \frac{I_{PEAK}^2 L}{2} \quad (5)$$

where $\alpha$ is a constant whose value can be calculated before operation of a power supply for which the disclosed power transfer techniques are used.

Using the value of $\alpha$ substituted in Eq. 4, a run-time calculation for the amount charge transferred during operation is expressed as:

$$Q_{BATT} = \frac{\alpha}{V_{IN} - V_{OUT}} \quad (6)$$

Figure 4:
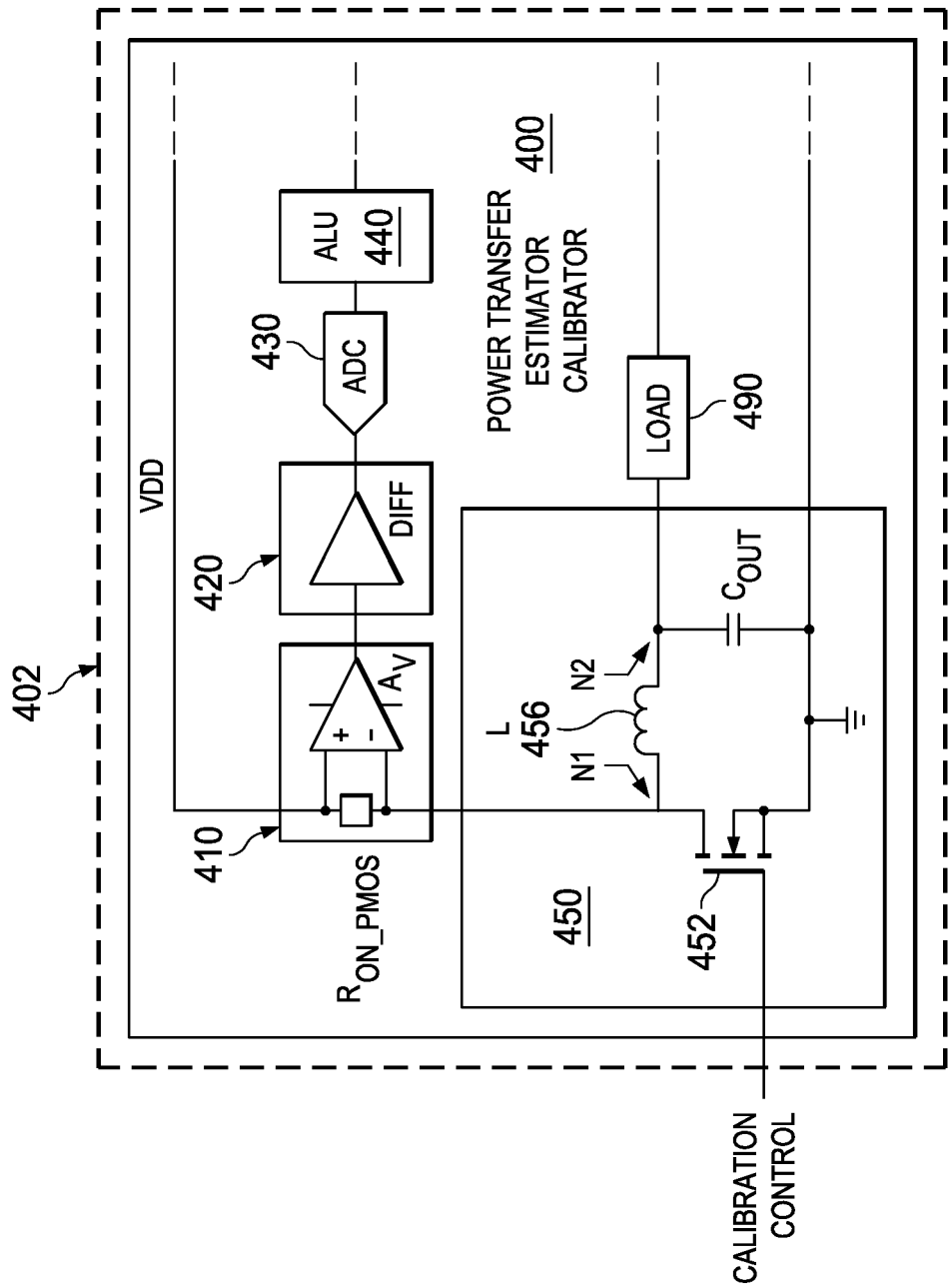
FIG. 4 is a schematic diagram of a power transfer estimator calibrator in accordance with example embodiments of the disclosure.

FIG. 4 is a schematic diagram of a power transfer estimator calibrator in accordance with example embodiments of the disclosure. The power transfer estimator calibrator 400 is an example embodiment of the power transfer estimator 138 of FIG. 1. Generally described, the power transfer estimator calibrator 400 includes a calibration unit 404 and a buck converter 450. The calibration circuitry 404 is formed on a substrate 402 upon which the buck converter 450 is also optionally formed.

The calibration circuitry 404 includes a differential amplifier 410, a differentiator (DIFF) 420, an analog-to-digital converter (ADC) 430, and an arithmetic logic unit (ALU) 440. The calibration circuitry 404 is operable to measure the inductance of inductor 456 of the buck converter 450. The measurement of the inductor 456 can be used to calibrate the power transfer estimator system 200 (e.g., to enhance the accuracy of power transfer estimates made by the power transfer estimator system 200).

The differential amplifier 410 (of calibration circuitry 404) is operable to amplify a sensing signal (e.g., differential voltage) developed across a high-side power switch 412 and functions as a gain stage for the differentiator 420. The high-side power switch 212 is a power switch such as the high-side PMOS switch 212 and is operable to develop the differential voltage in accordance with the on-state drain-to-source resistance ($R_{ON\_PMOS}$) of the high-side power switch 412. The source (e.g., first terminal) of high-side power switch 412 is coupled to the source voltage VDD and to the non-inverting input of the differential amplifier 410. The drain (e.g., second terminal) of the high-side power switch 412, is coupled to node N1 of the buck converter 450 and to the inverting input of the differential amplifier 410.

The output of the differential amplifier 410 is coupled to the input of the differentiator 420. The output of the differential amplifier is a single-ended voltage proportional to the differential voltage developed across the high-side power switch 412 and accordingly is proportional to the inductor current during the time on (Ton) period 322, for example. The differentiator 420 is operable to (e.g., in accordance with differential calculus) to differentiate (e.g., to determine the first derivative of) the single-ended input voltage to generate an output signal of the derivative (e.g., slope) of the single-ended input voltage.

The output signal of the differentiator 420 is coupled to the input of the ADC 430. The ADC 430 is operable to convert the derivative of the single-ended input voltage to a digital value, which is in turn, coupled to the ALU 440. As discussed below with respect to the below equations, the ALU is operable to determine the value of the inductor 456 in response to the measured slope of the inductor 456 during a calibration operation in which the buck converter 450 is energized. The ALU 440 optionally provides an indication of the measurement to another device, such as to a computing device 100 for purposes of system maintenance, selection of power modes, user instruction, and the like. (In an embodiment, the ALU 440 can perform a differentiation function digitally using values sampled from the sensing signal over time to determine the measured slope of the inductor.)

The buck converter 450 includes a low-side NMOS switch 452, the inductor 456, a capacitor Cout, The drain of low-side NMOS switch 452 is coupled to an input terminal of the inductor 456 via node N1. In operation (e.g., during a selected period of time during the calibration operation), the high-side power switch 412 is closed for a limited duration of selected length, and current from the voltage source VDD passes through the high-side power switch 412 (e.g., generating the above-mentioned differential voltage) to the input terminal of the inductor 456. The current passed through high-side power switch 412 energizes the inductor 456. Current from the inductor 456 flows through an output terminal of the inductor 456 (via nod N2) to either a load 490 or the capacitor Cout.

In this embodiment, the power transfer estimator calibrator 400 is operable to calculate the value of inductance L, for example, such that the above-described methods for determining the cumulative charge transfer (e.g., through the buck converter 210 and 450 of a power transfer estimator) can be used without prior knowledge of the inductance L. For example, an integrated circuit (in which the disclosed techniques are programmed and/or formed) can be initially manufactured in relatively large lots and later used in various-sized power converters that are include inductors of various values.

The cumulative charge transfer is determined in response to the value of L (e.g., of inductor 452) and the duration of the on time of the high-side power switch 412. The value of L is calculated during a calibration operation by opening the high-side power switch 421 of the sensing for a selected amount of time (Tfix). The selected duration of Tfix is typically on the order of from one to several switching cycle time periods of a DCM power supply in a normal operating mode (e.g., during PWM or PFM operation). The slope of the current flowing through inductor 452 is measured by deriving (e.g., taking the first derivative) of the differential voltage generated across the source and drain of the high-side power switch 421 during the time period Tfix. The derivative is used to calculate the value of L in accordance with the following equations.

The slope is expressed as:

$$\text{Slope} = \frac{\left(\frac{V_{IN} - V_{OUT}}{L} t_{FIX}\right) R_{ON\_PMOS}}{\partial t} = \left(\frac{V_{IN} - V_{OUT}}{L}\right) R_{ON\_PMOS} \quad (7)$$

Equation 7 expressed in terms of inductance L is:

$$L = \frac{V_{IN} - V_{OUT}}{\text{Slope}} R_{ON\_PMOS} \quad (8)$$

Equation 8 has one independent variable (inductance L) and accordingly can be "precalculated" with the results being stored in a look-up table (LUT) for fast execution times and/or lower operating power. Equation 8 expressed in terms of a look-up table is:

$$L_{LUT} = \frac{(V_{IN} - V_{OUT})_{LUT}}{\text{Slope}_{LUT}} R_{ON\_PMOS\_LUT} \quad (9)$$

When only some portions equation 9 have been precalculated, the inductance can be determined by the ALU 440 in accordance with the below equation 10:

$$L = L_{LUT} \frac{(V_{IN} - V_{OUT})}{\text{Slope}} \cdot \frac{(\text{Slope})_{LUT}}{(V_{IN} - V_{OUT})_{LUT}} \cdot \frac{R_{ON\_PMOS}}{R_{ON\_PMOS\_LUT}} \quad (10)$$

In an embodiment, a controller (e.g., such as a microcontroller or a digital signal processor) is used to control one or more attributes of the power transfer estimator 138 and other system level controlled variables such as power mode selection and power mode transitioning. The variables are software programmable, which allows more flexibility for implementing the disclosed control schemes and provides an enhanced ability to adaptively adjust to dynamically changing conditions for optimized system performance.

In various embodiments, the above described components can be implemented in hardware or software, internally or externally, and share functionality with other modules and components as illustrated herein. For example, the processing and memory portions of the power transfer estimator 138 can be implemented outside of a device and/or substrate upon which the power converter is formed.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A circuit for estimating power transfer, comprising
a power switch for selectively coupling an input terminal of an inductor to a voltage source;
an accumulator for generating a switching metric in response to the actuation of the power switch; and
a processor operable to determine an estimate of power transferred from the input terminal of the inductor to an output pin of the inductor, wherein the power transfer estimation is determined in response to an inductance value of the inductor, a voltage of the voltage source, and the switching metric;
a differential voltage amplifier that is operable to generate a single-ended voltage in response to a voltage developed across a source and drain of the power switch; and
a differentiator that is operable to generate a derivative of the generated singled-ended voltage.

2. The circuit of claim 1, wherein the processor is operable to determine a value of the inductance in response to the derivative of the generated single-ended voltage.

3. A power converter, comprising
a power switch for selectively coupling an input terminal of an inductor to a voltage source;
an amplifier for developing a sensing signal in response to a voltage developed across terminals of the power switch when the power switch is turned on; and
a processor operable to determine the inductance value of the inductor in response to the sensing signal;
wherein the power switch is a high-side power switch;
wherein the processor is operable to determine the inductance value of the inductor in response to a first derivative the sensing signal; and
wherein processor is operable to determine the inductance value of the inductor in accordance with the formula $$L = \frac{V_{IN} - V_{OUT}}{\text{Slope}} R_{ON\_PMOS},$$

where L is the inductance value of the inductor, $V_{IN}$ is the input voltage of the converter, $V_{OUT}$ is the output voltage of the converter, $R_{ON\_PMOS}$ is the active-on resistance of the power switch, and Slope is a value determined from the sensing signal.

4. A power converter, comprising
a power switch for selectively coupling an input terminal of an inductor to a voltage source;
an amplifier for developing a sensing signal in response to a voltage developed across terminals of the power switch when the power switch is turned on; and
a processor operable to determine the inductance value of the inductor in response to the sensing signal;
wherein the power switch is a high-side power switch;
wherein the processor is operable to determine the inductance value of the inductor in response to a first derivative the sensing signal; and
wherein the processor is operable to determine an estimate of power transferred from the input terminal of the inductor to an output pin of the inductor, wherein the power transfer estimation is determined in response to the determined inductance value of the inductor, a voltage of the voltage source, and an accumulated switching metric.

5. A method for estimating power transfer of a power converter, comprising
actuating a power switch to selectively couple an input terminal of an inductor to a voltage source for the power converter;
accumulating a switching metric in response to the actuation of the power switch; and
determining an estimate of power transferred from the input terminal of the inductor to an output pin of the inductor, wherein the power transfer estimation is determined in response to an inductance value of the inductor, a voltage of the voltage source, and the switching metric; and determining the inductance value of the inductor in response a sensing signal developed in response to a voltage developed across terminals of the power switch when the power switch is turned on.

6. The method of claim 5, wherein the inductance value of the inductor is determined in response to a measurement of the slope of the sensing signal.

\* \* \* \* \*